United States Patent
Okudaira

[11] 3,966,306
[45] June 29, 1976

[54] LARGE APERTURE SUPER WIDE ANGLE LENS

[75] Inventor: Sadao Okudaira, Ranzan, Japan

[73] Assignee: Asahi Kogaku Kogyo Kabushiki Kaisha, Tokyo, Japan

[22] Filed: Feb. 6, 1975

[21] Appl. No.: 547,684

[30] Foreign Application Priority Data
Feb. 28, 1974  Japan............................ 49-23851

[52] U.S. Cl................................. 350/214; 350/176; 350/196
[51] Int. Cl.².................... G02B 9/64; G02B 5/20
[58] Field of Search................... 350/214, 176, 196

[56] References Cited
UNITED STATES PATENTS

| | | | |
|---|---|---|---|
| 3,728,011 | 4/1973 | Momi.................... | 350/214 |
| 3,748,021 | 7/1973 | Tajima et al............ | 350/176 X |
| 3,856,386 | 12/1974 | Fujioka................. | 350/214 |

Primary Examiner—Paul A. Sacher
Attorney, Agent, or Firm—Sughrue, Rothwell, Mion, Zinn & Macpeak

[57] ABSTRACT

A super wide angle lens system consisting of thirteen lenses grouped in eleven lens components wherein the following conditions (1) to (6) are satisfied:

$F/0.75 < |F_{1,2}| < F/0.45$, $F_{1,2} < 0$  1.

$F/0.32 < |F_{1,2,3}| < F/0.18$, $F_{1,2,3} < 0$  2.

$0.8 < F/f_6 < 2.5$  3.

$0.4F < d_{17} < 0.7F$  4.

$1.2F < r_{20} < 1.8F$, $1.75 < n_{11}$  5.

$58 < (\nu_{10} + \nu_{12} + \nu_{13}) / 3 < 71$.  6.

2 Claims, 10 Drawing Figures

FIG. 1
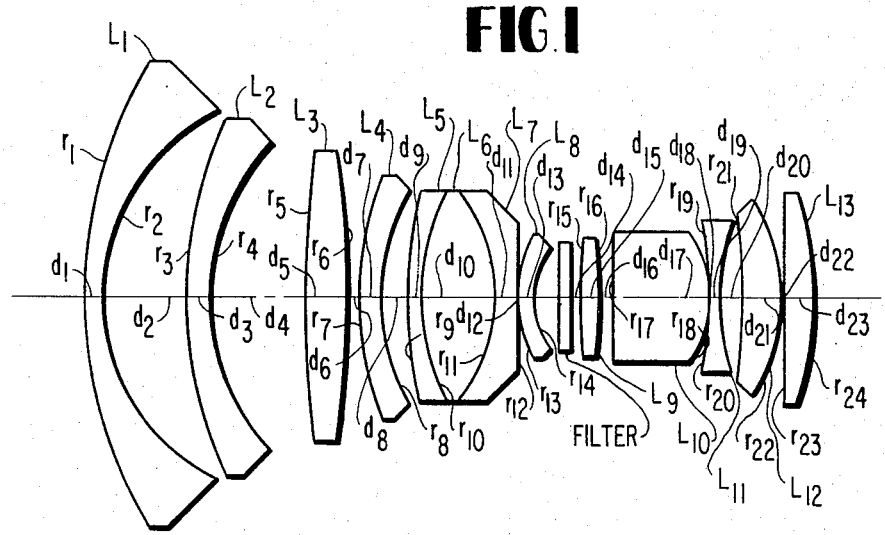
FIG. 2a
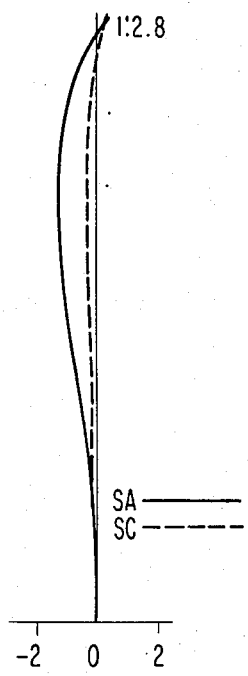
FIG. 2b
FIG. 2c
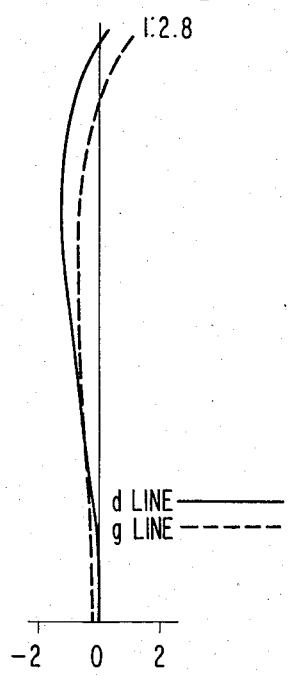
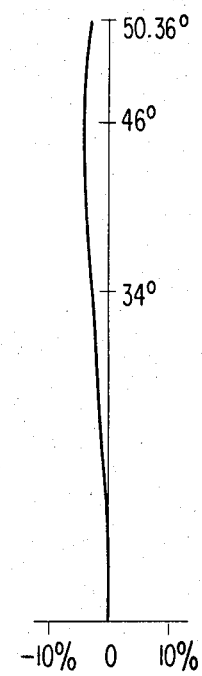
FIG. 2d
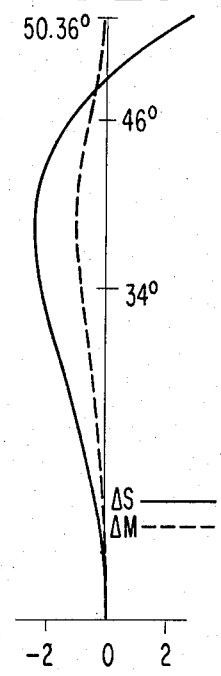

FIG.3
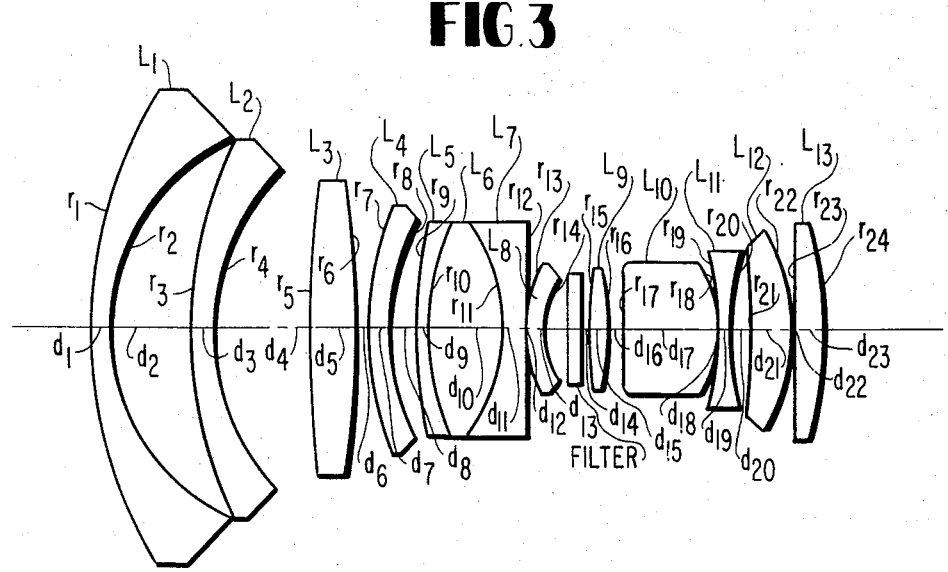
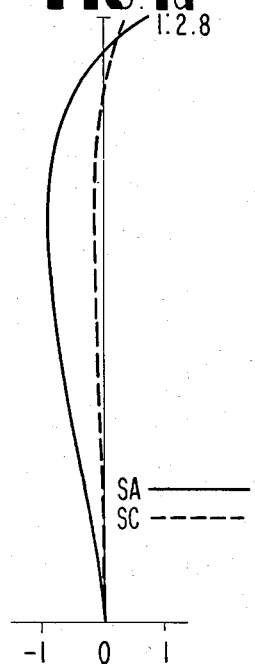
FIG.4a
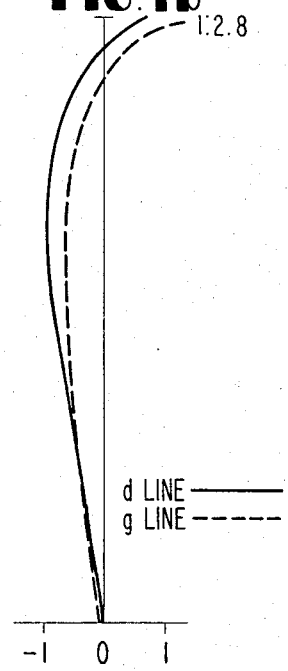
FIG.4b
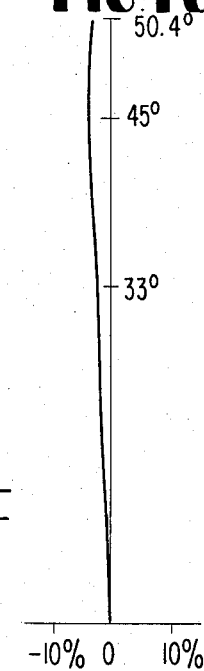
FIG.4c
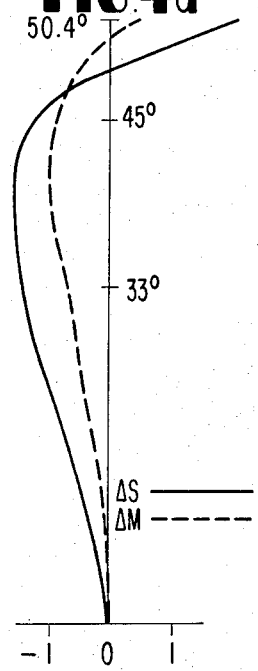
FIG.4d

LARGE APERTURE SUPER WIDE ANGLE LENS

SUMMARY OF THE INVENTION

As the development of wide angle lenses advance, a small and large aperture retrofocus type super wide angle lens has become a principle design objective. The present invention relates to a comparatively large aperture lens of this type, and more specifically to a super wide angle lens system consisting of 13 lenses grouped in 11 lens components wherein the following conditions (1) to (6) are satisfied:

$F/0.75 < |F_{1,2}| < F/0.45, F_{1,2} < 0$     1.

$F/0.32 < |F_{1,2,3}| < F/0.18, F_{1,2,3} < 0$     2.

$0.8 < F/f_6 < 1.5$     3.

$0.4F < d_{17} < 0.7F$     4.

$1.2F < r_{20} < 1.8F,$     5.
$1.75 < n_{11}$ $58 < (\nu_{10} + \nu_{12} + \nu_{13})/3 < 71.$     6.

BRIEF DESCRIPTION OF THE DRAWINGS

The specific nature of the invention, as well as other objects, aspects, uses and advantages thereof, will clearly appear from the following description and from the accompanying drawings, in which:

FIG. 1 is a view showing the lens system in accordance with the first embodiment of the invention including a filter, FIGS. 2a to 2d show aberration curves obtained by the lens system in accordance with the first embodiment of the invention, FIG. 3 is a view showing the lens system in accordance with the second embodiment of the invention including a filter, and FIGS. 4a to 4d show aberration curves obtained by the lens system in accordance with the second embodiment of the invention.

DESCRIPTION OF THE PREFERRED EMBODIMENTS

Describing the construction of the lens first, the first and the second lenses are negative meniscus lenses convex to the object. The third lens is a positive lens, and the fifth, sixth and seventh lenses are cemented together. The fourth lens is a negative meniscus lens located between the third and the fifth lenses and convex to the object similarly to the first and the second meniscus lenses. The fifth and the seventh lenses are negative lenses and cemented to the both surfaces of the sixth biconvex lens. The eighth lens is a negative meniscus lens convex to the object, and a filter is located therebehind. (The position of the filter is, however, not limited to between the eighth and ninth lenses.) Behind the filter is located the ninth positive lens. A comparatively thick tenth positive lens is located behind the ninth lens, and a negative eleventh lens is located therebehind. The twelfth and the thirteenth lenses are positive lenses located so that the greater curvature side thereof face the image.

Now the conditions to be satisfied will be described in detail. The reference characters designate the following factors:

F: composite focal length of the whole lens system
$F_{1,2,\ldots,i}$: composite focal length of the lens system consisting of the first to the $i$-th lenses
$n_i$: refractive index for $d$-line of the $i$-th lens
$r_j$: radius of curvature of the $j$-th face
$\nu_i$: Abbe's number of the $i$-th lens
$d_k$: $k$-th lens thickness or spacing
$f_i$: focal length of the $i$-th lens.

The conditions are as follows:

$F/0.75 < |F_{1,2}| < F/0.45, F_{1,2} < 0$     1.

$F/0.32 < |F_{1,2,3}| < F/0.18, F_{1,2,3} < 0$     2.

$0.8 < F/f_6 < 1.5$     3.

$0.4F < d_{17} < 0.7F$     4.

$1.2F < r_{20} < 1.8F,$     5.
$1.75 < n_{11}$ $58 < (\nu_{10} + \nu_{12} + \nu_{13})/3 < 71.$     6.

The first condition (1) defines the composite focal length of the front lens component in order to obtain a long back focal length. In order to obtain a large aperture and wide angle lens, the front lens component is made to consist of two negative meniscus lenses. By using two meniscus lenses, the degradation of the aberration occuring when only one lens is used is prevented. If the focal length $|F_{1,2}|$ becomes shorter than F/0.75, the aberration is increased. This means that the glass used for the second lens must have a comparatively high refractive index. If the focal length $|F_{1,2}|$ becomes longer than F/0.45, the back focus cannot be obtained and it becomes unnecessary to use two lenses for accomplishing the desired effect.

The second condition (2) defines the focal length of the third lens provided for correcting the distortion. If the focal length $F_{1,2,3}$ becomes longer than F/0.18, the first (1) condition becomes difficult to satisfy, whereas the distortion is well corrected. If the focal length becomes shorter than F/0.32, it becomes difficult to make the sixth face work effectively without lowering the effect of preventing distortion.

The third condition (3) defines the power of the sixth lens to properly correct the chromatic aberration and balances the coma aberration and prevent the increase in the spherical aberration. Although this condition is concerned with the radius of curvature as well as the chromatic aberration, the main purpose of this condition is related to the power of the sixth lens. When $F/f_6$ is smaller than 0.8, the correction of chromatic aberration becomes insufficient, and the spherical aberration must be partly corrected by other lenses, which results in an increase in aberration. In addition, the coma aberration is imbalanced, and the aberration is enlarged in the field of wide angles. To the contrary, when the ratio $F/f_6$ becomes larger than 1.5, lenses are loaded with a reversely effecting burden to correct aberrations particularly to correct the coma aberration.

The fourth condition (4) defines the thickness of the tenth lens to correct the coma aberration in association with the fifth condition (5). When the thickness is larger than 0.7F, the amount of light becomes insufficient or the rear lens component is required to be large although the coma is sufficiently corrected. When the thickness is smaller than 0.4F, the coma is not corrected sufficiently and it becomes difficult to obtain a large aperture lens system because the fifth condition is hardly corrected.

The fifth condition (5) defines the radius of curvature of the rear face of the eleventh lens and the refractive index of the glass thereof in order to correct the coma aberration. Particularly, the light incident to the lens system at a comparatively small angle is influenced by this condition. The condition that $n_{11}$ is larger than 1.75 is indispensable for determining the radius of curvature $r_{20}$ in consideration of the balance of chromatic aberration in the rear lens component. When $n_{11}$ is smaller than 1.75, the radius of curvature $r_{20}$ becomes too small and accordingly the coma aberration is degraded. Under the above condition, when $r_{20}$ becomes longer than 1.8F, the aberration increases in the opposite side and it becomes difficult to correct the increased aberration.

The sixth condition (6) are indispensable for correction of the chromatic aberrations in the rear lens component. If the mean value of the Abbe's number is smaller than 58, the power of the eleventh lens must be increased or the number of lenses must be increased. If the power is increased, the coma aberration is degraded as in the fifth condition. The number of lenses is naturally desired to be as small as possible.

Two specific examples of the present invention will be described hereinbelow.

The first example is shown in FIG. 1 and consists of first and second negative mensicus lenses $L_1$ and $L_2$ convex to the object, a positive lens $L_3$, a negative meniscus lens $L_4$ which, like lenses $L_1$ and $L_2$, is convex to the object, a cemented triplet consisting of negative lenses $L_5$ and $L_7$ cemented to opposite surfaces of a biconvex lens $L_6$, a negative meniscus lens $L_8$ convex to the object, a positive lens $L_9$, a comparatively thick positive lens $L_{10}$, a negative lens $L_{11}$, and positive lenses $L_{12}$ and $L_{13}$ both of which are convex to the image. A filter is located between lenses $L_8$ and $L_9$, although the position of the filter is not critical. The radii $r_1$ to $r_{24}$ and the thicknesses and separations $d_1$ to $d_{23}$, along with the refractive indices $n_1$ to $n_{13}$ and Abbe numbers $\nu_1$ to $\nu_{13}$ for lenses $L_1$ to $L_{13}$ are given in Table 1 as follows:

$F = 100$
$F_{1,2} = 171.5$
$F_{1,2,3} = -401.4$
$f_6 = 82.5$

TABLE 1

| Lens | Radius of Curvature r | Lens Thickness or Distance d | Refractive Index n | Abbe No. $\nu$ |
|---|---|---|---|---|
| $L_1$ | $r_1 = 256.3$ | $d_1 = 6.5$ | $n_1 = 1.6031$ | $\nu_1 = 60.7$ |
|  | $r_2 = 121.6$ | $d_2 = 47.4$ |  |  |
| $L_2$ | $r_3 = 253.9$ | $d_3 = 14.1$ | $n_2 = 1.7410$ | $\nu_2 = 52.7$ |
|  | $r_4 = 125.8$ | $d_4 = 57.4$ |  |  |
| $L_3$ | $r_5 = 783.8$ | $d_5 = 22.9$ | $n_3 = 1.6258$ | $\nu_3 = 35.7$ |
|  | $r_6 = -430.9$ | $d_6 = 6.1$ |  |  |
| $L_4$ | $r_7 = 211.3$ | $d_7 = 9.3$ | $n_4 = 1.8160$ | $\nu_4 = 46.8$ |
|  | $r_8 = 119.7$ | $d_8 = 16.4$ |  |  |
| $L_5$ | $r_9 = 277.8$ | $d_9 = 8.1$ | $n_5 = 1.5473$ | $\nu_5 = 53.6$ |
| $L_6$ | $r_{10} = 119.3$ | $d_{10} = 43.2$ | $n_6 = 1.7200$ | $\nu_6 = 50.3$ |
| $L_7$ | $r_{11} = -100.4$ | $d_{11} = 12.6$ | $n_7 = 1.5613$ | $\nu_7 = 45.2$ |
|  | $r_{12} = 5113.5$ | $d_{12} = 0.5$ |  |  |
| $L_8$ | $r_{13} = 89.6$ $d_{13} = 8.1$ $r_{14} = 47.6$ | | $n_8 = 1.6968$ | $\nu_8 = 56.5$ |
|  |  | $d_{14} = 20.5$ filter thickness 4.3 |  |  |
| $L_9$ | $r_{15} = 455.8$ | $d_{15} = 10.3$ | $n_9 = 1.8051$ | $\nu_9 = 25.4$ |
|  | $r_{16} = -249.8$ | $d_{16} = 9.9$ |  |  |
| $L_{10}$ | $r_{17} = -834.6$ | $d_{17} = 57.2$ | $n_{10} = 1.4645$ | $\nu_{10} = 66.0$ |
|  | $r_{18} = -66.9$ | $d_{18} = 0.5$ |  |  |
| $L_{11}$ | $r_{19} = -201.9$ | $d_{19} = 5.4$ | $n_{11} = 1.8051$ | $\nu_{11} = 25.4$ |
|  | $r_{20} = 157.9$ | $d_{20} = 11.1$ |  |  |
| $L_{12}$ | $r_{21} = -1167.6$ | $d_{21} = 25.5$ | $n_{12} = 1.4645$ | $\nu_{12} = 66.0$ |
|  | $r_{22} = -95.6$ | $d_{22} = 0.5$ |  |  |
| $L_{13}$ | $r_{23} = 10629.3$ | $d_{23} = 18.9$ | $n_{13} = 1.6204$ | $\nu_{13} = 60.3$ |
|  | $r_{24} = -209.0$ |  |  |  |

FIG. 2a shows the spherical aberration and sine condition, FIG. 2b shows the chromatic aberration, FIG. 2c shows the distortion, and FIG. 2d shows the astigmatism of the lens system shown in FIG. 1 and defined in Table 1.

The second example is shown in FIG. 3 and consists of first and second negative meniscus lenses $L_1$ and $L_2$ convex to the object, a positive lens $L_3$, a negative meniscus lens $L_4$ which, like lenses $L_1$ and $L_2$, is convex to the object, a cemented triplet consisting of negative lenses $L_5$ and $L_7$ cemented to opposite surfaces of a biconvex lens $L_6$, a negative meniscus lens $L_8$ convex to the object, a positive lens $L_9$, a comparatively thick positive lens $L_{10}$, a negative lens $L_{11}$ and positive meniscus lenses $L_{12}$ and $L_{13}$ both of which are convex to the image. A filter is located between lenses $L_8$ and $L_9$, although again the position of the filter is not critical. The radii $r_1$ to $r_{24}$ and the thicknesses and separations $d_1$ to $d_{23}$, along with the refractive indices $n_1$ to $n_{13}$ and Abbe numbers $\nu_1$ to $\nu_{13}$ for lenses $L_1$ to $L_{13}$ are given in Table 2 as follows:

$F = 100$
$F_{1.2} = -161.8$
$F_{1.2.3} = -407.1$
$f_6 = 80.6$ negative meniscus lens convex to the object, the fifth, sixth and seventh lenses constitute a cemented triplet, the eighth lens is a negative meniscus lens convex to the object, the ninth lens is a positive lens, the tenth lens is a thick positive lens, the eleventh lens is a negative lens, and the twelfth and thirteenth lenses are positive lenses convex to the image, and further comprising a filter located between said eighth and ninth lenses, wherein the radii $r_1$ to $r_{24}$, the thickness and separations $d_1$ to $d_{23}$, the refractive indices $n_1$ to $n_{13}$, and Abbe numbers $\nu_1$ to $\nu_{13}$ of said first to thirteen lenses $L_1$ to $L_{13}$, respectively, satisfy the following conditions:

TABLE 2

| Lens | Radius of Curvature r | Lens Thickness or Distance d | Refractive Index n | Abbe No. $\nu$ |
|---|---|---|---|---|
| $L_1$ | $r_1 = 234.4$ | $d_1 = 6.5$ | $n_1 = 1.6031$ | $\nu_1 = 60.7$ |
|  | $r_2 = 115.9$ | $d_2 = 48.9$ |  |  |
| $L_2$ | $r_3 = 281.5$ | $d_3 = 14.1$ | $n_2 = 1.7340$ | $\nu_2 = 51.5$ |
|  | $r_4 = 121.9$ | $d_4 = 56.5$ |  |  |
| $L_3$ | $r_5 = 600.7$ | $d_5 = 27.6$ | $n_3 = 1.6200$ | $\nu_3 = 36.3$ |
|  | $r_6 = -416.3$ | $d_6 = 7.1$ |  |  |
| $L_4$ | $r_7 = 205.1$ | $d_7 = 9.3$ | $n_4 = 1.7995$ | $\nu_4 = 42.2$ |
|  | $r_8 = 129.4$ | $d_8 = 14.5$ |  |  |
| $L_5$ | $r_9 = 280.4$ | $d_9 = 8.1$ | $n_5 = 1.5523$ | $\nu_5 = 63.7$ |
| $L_6$ | $r_{10} = 111.9$ | $d_{10} = 42.1$ | $n_6 = 1.7200$ | $\nu_6 = 50.3$ |
| $L_7$ | $r_{11} = -101.4$ | $d_{11} = 12.6$ | $n_7 = 1.5613$ | $\nu_7 = 45.2$ |
|  | $r_{12} = -13184.4$ | $d_{12} = 0.5$ |  |  |
| $L_8$ | $r_{13} = 102.0$ | $d_{13} = 6.4$ | $n_8 = 1.7200$ | $\nu_8 = 50.3$ |
|  | $r_{14} = 47.5$ | $d_{14} = 16.9$ filter thickness 4.3 |  |  |
| $L_9$ | $r_{15} = 485.3$ | $d_{15} = 11.7$ | $n_9 = 1.8051$ | $\nu_9 = 25.4$ |
|  | $r_{16} = -264.1$ | $d_{16} = 9.9$ |  |  |
| $L_{10}$ | $r_{17} = -5686.1$ | $d_{17} = 62.1$ | $n_{10} = 1.4645$ | $\nu_{10} = 66.0$ |
|  | $r_{18} = -66.7$ | $d_{18} = 0.5$ |  |  |
| $L_{11}$ | $r_{19} = -273.7$ | $d_{19} = 6.5$ | $n_{11} = 1.8051$ | $\nu_{11} = 25.4$ |
|  | $r_{20} = 151.0$ | $d_{20} = 14.6$ |  |  |
| $L_{12}$ | $r_{21} = -725.0$ | $d_{21} = 23.4$ | $n_{12} = 1.4645$ | $\nu_{12} = 66.0$ |
|  | $r_{22} = -100.0$ | $d_{22} = 0.5$ |  |  |
| $L_{13}$ | $r_{23} = -3616.9$ | $d_{23} = 18.7$ | $n_{13} = 1.6204$ | $\nu_{13} = 60.3$ |
|  | $r_{24} = -200.9$ |  |  |  |

FIG. 4a shows the spherical aberration and sine condition, FIG. 4b shows the chromatic aberration. FIG. 4c shows the distortion, and FIG. 4d shows the astigmatism of the lens system shown in FIG. 3 and defined in Table 2.

It will be apparent that the embodiments shown are only exemplary and that various modifications can be made in construction and arrangement within the scope of the invention as defined in the appended claims.

What is claimed is:

1. A super wide angle lens comprising 13 lenses grouped in 11 components wherein the first and second lenses are negative meniscus lenses convex to the object, the third lens is a positive lens, the fourth lens is a

| Lens | Radius of Curvature r | Lens Thickness or Distance d | Refractive Index n | Abbe No. $\nu$ |
|---|---|---|---|---|
| $L_1$ | $r_1 = 256.3$ | $d_1 = 6.5$ | $n_1 = 1.6031$ | $\nu_1 = 60.7$ |
|  | $r_2 = 121.6$ | $d_2 = 47.4$ |  |  |
| $L_2$ | $r_3 = 253.9$ | $d_3 = 14.1$ | $n_2 = 1.7410$ | $\nu_2 = 52.7$ |
|  | $r_4 = 125.8$ | $d_4 = 57.4$ |  |  |
| $L_3$ | $r_5 = 783.8$ | $d_5 = 22.9$ | $n_3 = 1.6258$ | $\nu_3 = 35.7$ |
|  | $r_6 = -430.9$ | $d_6 = 6.1$ |  |  |
| $L_4$ | $r_7 = 211.3$ | $d_7 = 9.3$ | $n_4 = 1.8160$ | $\nu_4 = 46.8$ |
|  | $r_8 = 119.7$ | $d_8 = 16.4$ |  |  |

-continued

| Lens | Radius of Curvature r | Lens Thickness or Distance d | Refractive Index n | Abbe No. $\nu$ |
|---|---|---|---|---|
| $L_5$ | $r_9 = 277.8$ | $d_9 = 8.1$ | $n_5 = 1.5473$ | $\nu_5 = 53.6$ |
| $L_6$ | $r_{10} = 119.3$ | $d_{10} = 43.2$ | $n_6 = 1.7200$ | $\nu_6 = 50.3$ |
| $L_7$ | $r_{11} = -100.4$ | $d_{11} = 12.6$ | $n_7 = 1.5613$ | $\nu_7 = 45.2$ |
|  | $r_{12} = 5113.5$ | $d_{12} = 0.5$ |  |  |
| $L_8$ | $r_{13} = 89.6$ | $d_{13} = 8.1$ | $n_8 = 1.6968$ | $\nu_8 = 56.5$ |
|  | $r_{14} = 47.6$ | $d_{14} = 20.5$ filter thickness 4.3 |  |  |
| $L_9$ | $r_{15} = 455.8$ | $d_{15} = 10.3$ | $n_9 = 1.8051$ | $\nu_9 = 25.4$ |
|  | $r_{16} = -249.8$ | $d_{16} = 9.9$ |  |  |
| $L_{10}$ | $r_{17} = -834.6$ | $d_{17} = 57.2$ | $n_{10} = 1.4645$ | $\nu_{10} = 66.0$ |
|  | $r_{18} = -66.9$ | $d_{18} = 0.5$ |  |  |
| $L_{11}$ | $r_{19} = -201.9$ | $d_{19} = 5.4$ | $n_{11} = 1.8051$ | $\nu_{11} = 25.4$ |
|  | $r_{20} = 157.9$ | $d_{20} = 11.1$ |  |  |
| $L_{12}$ | $r_{21} = -1167.6$ | $d_{21} = 25.5$ | $n_{12} = 1.4645$ | $\nu_{12} = 66.0$ |
|  | $r_{22} = -95.6$ |  |  |  |

-continued

| Lens | Radius of Curvature r | Lens Thickness or Distance d | Refractive Index n | Abbe No. $\nu$ |
|---|---|---|---|---|
|  |  | $d_{22} = 0.5$ |  |  |
| $L_{13}$ | $r_{23} = 10629.3$ | $d_{23} = 18.9$ | $n_{13} = 1.6204$ | $\nu_{13} = 60.3$ |
|  | $r_{24} = -209.0$ |  |  |  |

2. A super wide angle lens comprising thirteen lenses grouped in eleven components wherein the first and second lenses are negative meniscus lenses convex to the object, the third lens is a positive lens, the fourth lens is a negative meniscus lens convex to the object, the fifth, sixth and seventh lenses constitute a cemented triplet, the eighth lens is a negative meniscus lens convex to the object, the ninth lens is a positive lens, the tenth lens is a thick positive lens, the eleventh lens is a negative lens, and the twelfth and thirteenth lenses are positive lenses convex to the image, and further comprising a filter located between said eighth and ninth lenses, wherein the radii $r_1$ to $r_{24}$, the thicknesses and separations $d_1$ to $d_{23}$, the refractive indices $n_1$ to $n_{13}$, and Abbe numbers $\nu_1$ to $\nu_{13}$ of said first to thirteenth lenses $L_1$ to $L_{13}$, respectively, satisfy the following conditions:

| Lens | Radius of Curvature r | Lens Thickness or Distance d | Refractive Index n | Abbe No. $\nu$ |
|---|---|---|---|---|
| $L_1$ | $r_1 = 234.4$ | $d_1 = 6.5$ | $n_1 = 1.6031$ | $\nu_1 = 60.7$ |
|  | $r_2 = 115.9$ | $d_2 = 48.9$ |  |  |
| $L_2$ | $r_3 = 281.5$ | $d_3 = 14.1$ | $n_2 = 1.7340$ | $\nu_2 = 51.51$ |
|  | $r_4 = 121.9$ | $d_4 = 56.5$ |  |  |
| $L_3$ | $r_5 = 600.7$ | $d_5 = 27.6$ | $n_3 = 1.6200$ | $\nu_3 = 36.3$ |
|  | $r_6 = -416.3$ | $d_6 = 7.1$ |  |  |
| $L_4$ | $r_7 = 205.1$ | $d_7 = 9.3$ | $n_4 = 1.7995$ | $\nu_4 = 42.2$ |
|  | $r_8 = 129.4$ | $d_8 = 14.5$ |  |  |
| $L_5$ | $r_9 = 280.4$ | $d_9 = 8.1$ | $n_5 = 1.5523$ | $\nu_5 = 63.7$ |
| $L_6$ | $r_{10} = 111.9$ | $d_{10} = 42.1$ | $n_6 = 1.7200$ | $\nu_6 = 50.3$ |
| Lhd 7 | $r_{11} = -101.4$ | $d_{11} = 12.6$ | $n_7 = 1.5613$ | $\nu_7 = 45.2$ |
|  | $r_{12} = -13184.4$ | $d_{12} = 0.5$ |  |  |
| $L_8$ | $r_{13} = 102.0$ | $d_{13} = 6.4$ | $n_8 = 1.7200$ | $\nu_8 = 50.3$ |
|  | $r_{14} = 47.5$ | $d_{14} = 16.9$ filter thickness 4.3 |  |  |
| $L_9$ | $r_{15} = 485.3$ | $d_{15} = 11.7$ | $n_9 = 1.8051$ | $\nu_9 = 25.4$ |
|  | $r_{16} = -264.1$ | $d_{16} = 9.9$ |  |  |
| $L_{10}$ | $r_{17} = -5686.1$ | $d_{17} = 62.1$ | $n_{10} = 1.4645$ | $\nu_{10} = 66.0$ |
|  | $r_{18} = -66.7$ | $d_{18} = 0.5$ |  |  |
| $L_{11}$ | $r_{19} = -273.7$ | $d_{19} = 6.5$ | $n_{11} = 1.8051$ | $\nu_{11} = 25.4$ |
|  | $r_{20} = 151.0$ | $d_{20} = 14.6$ |  |  |
| $L_{12}$ | $r_{21} = -725.0$ | $d_{21} = 23.4$ | $n_{12} = 1.4645$ | $\nu_{12} = 66.0$ |
|  | $r_{22} = -100.0$ | $d_{22} = 0.5$ |  |  |
| $L_{13}$ | $r_{23} = -3616.9$ | $d_{23} = 18.7$ | $n_{13} = 1.6204$ | $\nu_{13} = 60.3$ |
|  | $r_{24} = -200.9$ |  |  |  |

* * * * *